July 15, 1924.  
P. ROBBINS  
TROLLEY POLE AND THE LIKE  
Filed Dec. 17, 1923    3 Sheets-Sheet 2

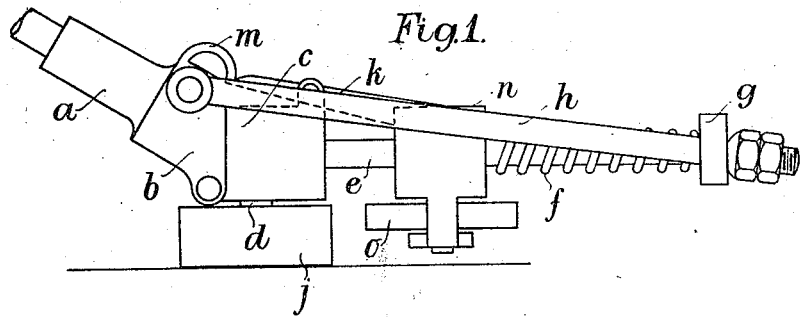
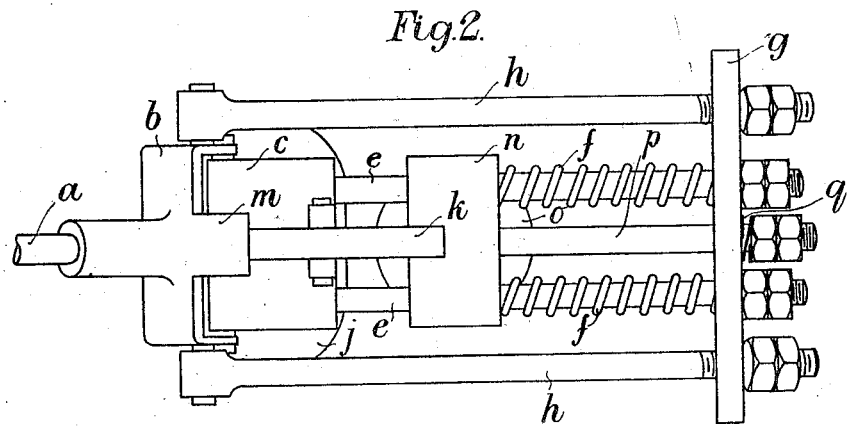
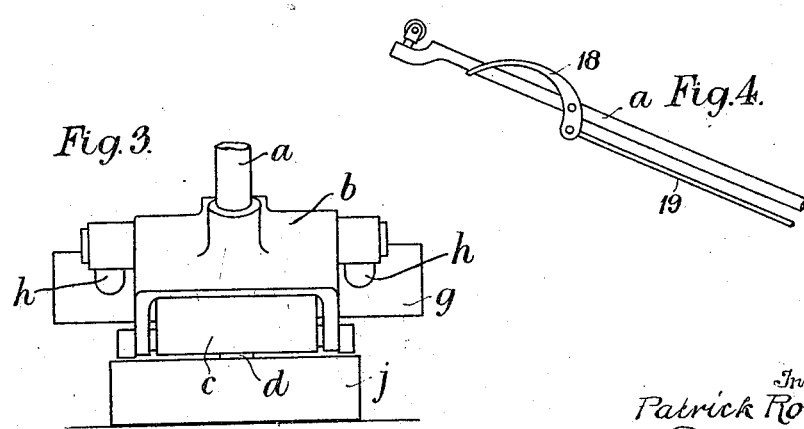

1,501,236

Inventor  
Patrick Robbins  
By Toulmin & Toulmin,  
Attorneys

July 15, 1924.

P. ROBBINS 1,501,236

TROLLEY POLE AND THE LIKE

Filed Dec. 17, 1923   3 Sheets-Sheet 3

Inventor
Patrick Robbins
By
Boulmin Boulmin
Attorneys

Patented July 15, 1924.

1,501,236

UNITED STATES PATENT OFFICE.

PATRICK ROBBINS, OF DUNDEE, SCOTLAND, ASSIGNOR OF TWO-THIRDS TO JAMES WILLIAMSON AND GEORGE BRANDER, BOTH OF DUNDEE, FORFAR, SCOTLAND.

TROLLEY POLE AND THE LIKE.

Application filed December 17, 1923. Serial No. 681,151.

*To all whom it may concern:*

Be it known that I, PATRICK ROBBINS, of Dundee, Scotland, a subject of the King of Great Britain and Ireland, have invented certain new and useful Improvements in or Relating to Trolley Poles and the like, of which the following is a specification.

This invention relates to trolley poles and the like such as are used on tramway and railway vehicles in connection with overhead conductor electric traction systems.

Hitherto with trolley poles, particularly those used on tramways, it frequently occurs that in the event of the trolley leaving the wire, the pole or trolley fouls with the cross stays of the overhead wiring and, besides damaging the wiring, the trolley head is often pulled off the trolley pole and falls to the ground to the danger of persons passing.

The object of this invention is to provide a trolley pole construction which enables this difficulty to be overcome, is easily installed, and simple and direct in operation.

According to this invention I provide, in spring pressed trolley poles and the like, means for automatically releasing the spring when the trolley head leaves the wire so that the trolley pole may fall by its own weight into a position clear of the wire, said means comprising a movable abutment for the spring, a catch adapted to engage with and hold the abutment when in its set position, and means for disengaging the catch to release the abutment when the trolley pole is raised beyond a predetermined position.

The invention also comprises means for re-setting and restricting the expansion of the spring when released, said re-setting means being operated by turning the trolley pole on its vertical pivot substantially as hereinafter described. The invention further comprises the provision of means on the trolley pole to effect the release of the trolley spring on the trolley pole striking an obstruction.

In the accompanying drawings:—

Fig. 1 is an elevation of one form of trolley pole construction in accordance with this invention and adapted for use on tramways with overhead conductors;

Fig. 2 is a plan and

Fig. 3 is an end view of the structure shown in Fig. 1;

Fig. 4 shows a modified arrangement for operating the mechanism shown in Figs. 1, 2 and 3;

Figure 5:
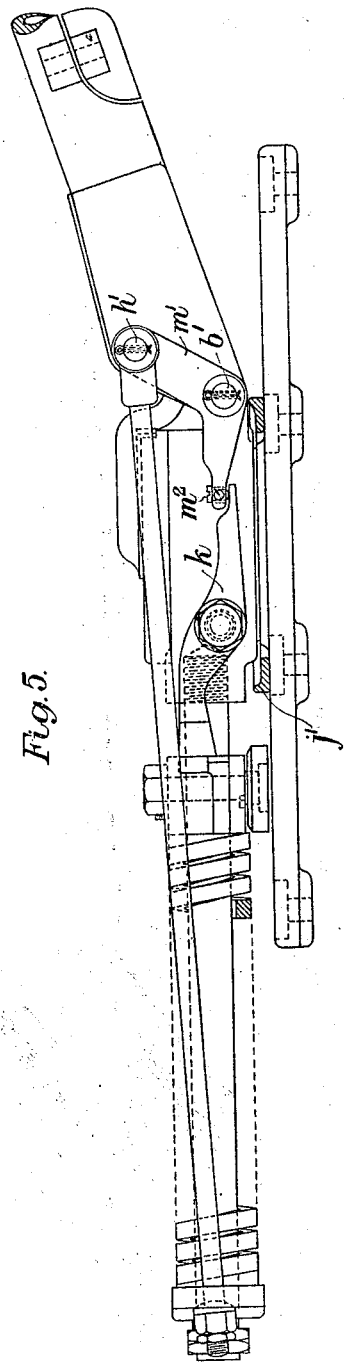
Fig. 5 is an elevation of a modification of the construction shown in Fig. 1.

Referring first to Figs. 1, 2 and 3 of the drawings, $a$ is the trolley pole which is pivotally mounted by means of a bracket $b$, upon a base $c$. The base $c$ is mounted on a vertical pivot $d$ provided on the roof of the vehicle. The base $c$ carries guide arms $e$ on which are mounted springs $f$ and a front sliding abutment $g$. The sliding abutment $g$ is connected by rods $h$ to the bracket $b$ so that the springs $f$ may tend to rotate the trolley pole upwards and thus provide the upward pressure necessary to keep the trolley head on the wire.

The construction so far described is that of a well known trolley pole mounting for tramway vehicles. The construction according to my invention however also includes a cam $j$ fixed on the roof of the vehicle, for example, surrounding the vertical pivot $d$, a sliding rear abutment $n$ mounted on the guides $e$ behind the springs $f$ and carrying a roller $o$ adapted to engage with the cam $j$, a catch lever $k$ pivoted on the base $c$ and engaging the said rear abutment $n$, and a release member such as an arm $m$ mounted on the bracket $b$ and adapted to engage the catch lever $k$. The rear abutment $n$ also carries a tie rod $p$ passing through the front abutment $g$ and along which the said abutment can slide, and adapted, when required, to take the pressure of the springs $f$.

In operation, the parts being in the set position as shown in the drawings, the rear abutment $n$ is held by the catch lever $k$ from sliding along the guide arms $e$ and thus forms a rear stop against which the springs $f$ abut. The springs $f$ acting at their front ends against the front abutment $g$ exert a lifting force on the trolley pole $a$ through the rods $h$ and bracket $b$, the tie rod $p$ not coming into operation in this position.

When the trolley head leaves the wire, the trolley arm rises by reason of the pull of the rods $h$ under the action of the springs $e$, so that the release arm $m$ depresses the catch lever $k$ and disengages it from the rear abutment $n$. The springs $f$ now push the rear abutment, $n$, along the guides $e$ towards the rear until checked by the tie rod $p$, and the springs $f$ therefore no longer exert a lifting force on the trolley pole $a$ which now descends by its own weight without resistance until the rear abutment $n$ is brought against the base $c$ or the roller $o$ abuts against the cam $j$. As the front abutment $g$, spring $f$ and rear abutment $n$ are held together by the tie rod $p$ they may slide as a unit along the guides $e$. The springs $f$ will check the descent of the trolley pole as soon as the rear abutment $n$ is prevented from further rearward movement along the guides $e$.

To reset the trolley pole, this is pulled sideways so as to be rotated about the vertical pivot $d$. This movement causes the roller $o$ to ride on the cam $j$ thus forcing the rear abutment $n$ forwards along the guides $e$ and compressing the springs $f$ until the catch $k$ falls into its operative position; to enable this to take place the trolley pole is held down sufficiently to hold the release arm $m$ out of engagement with the catch lever $k$. The device will then be in the set position as shown in the drawings.

The tie rod $p$ may be provided with a shock absorber or spring $q$ to prevent damage by the sudden release of the rear abutment $n$.

Referring now to Fig. 4, a bell crank lever is shown herein pivotally mounted on the trolley pole and one arm is connected by a rod 19 to the catch lever $k$ while the other arm 18 is curved and adapted to engage against any obstruction met with in the path of the trolley pole.

Other means may also be provided on the trolley pole itself for directly effecting the release of the catch $k$ when the trolley pole fouls any obstruction such as would fail to actuate the said catch by the release arm $m$.

Figure 6:
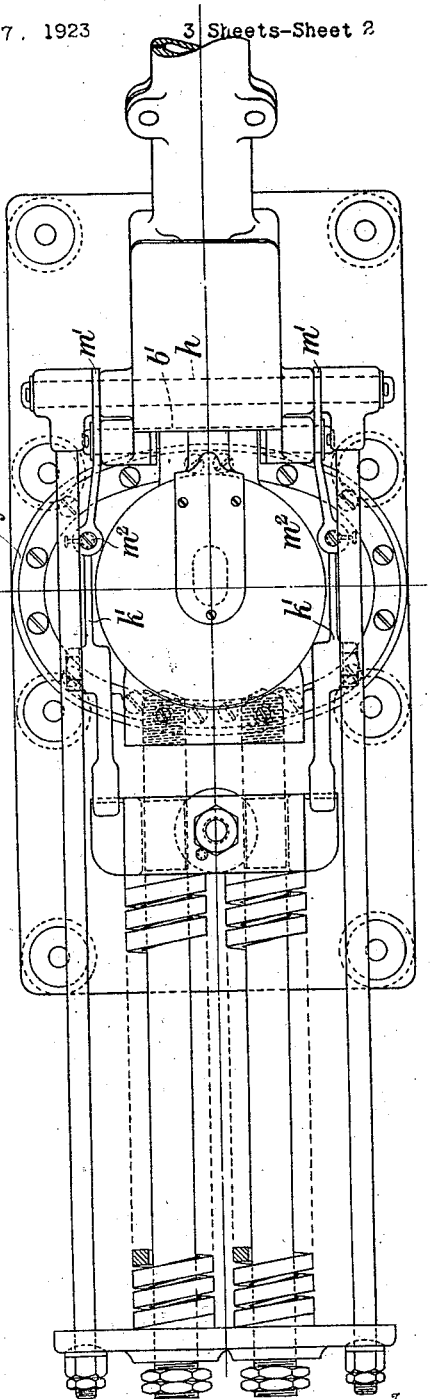
Fig. 6 is a plan of the structure shown in Fig. 5.
Figure 7:
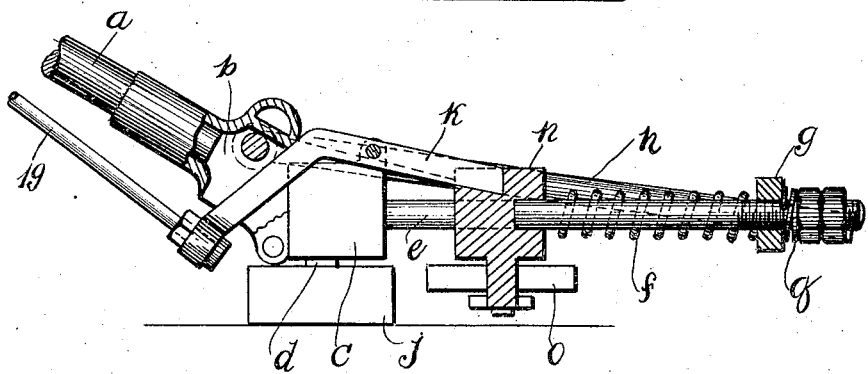
Fig. 7 is a vertical median longitudinal section through the device of Fig. 1.
Figure 8:
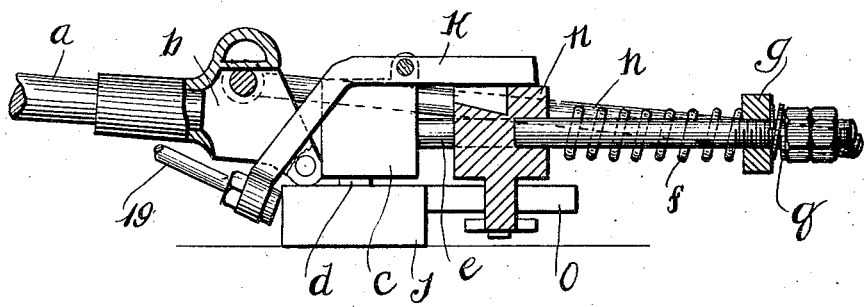
Fig. 8 is a similar section showing the device tripped.

Referring to Figs. 5 and 6, the modification shown herein is similar to the structure shown in Figs. 1, 2 and 3 except that two catch levers $k'$ are provided in place of the central catch lever $k$, and are differently located, being arranged one on each side of the base $c$, while the release arm $m$ is replaced by two arms $m'$ carried by the bracket $b$ on the pivots $h'$ and $b'$, these release arms carrying adjustable contact screws $m^2$ which engage with the catches $k'$ and provide means for nicely adjusting the release position.

What I claim and desire to secure by Letters Patent is:—

1. Trolley pole construction for an electrically driven vehicle, comprising in combination a horizontally and vertically pivoted trolley pole, a trolley head thereon adapted to make travelling contact with an overhead conductor, a spring for maintaining the said contact arranged between a front abutment connected to the trolley pole and a movable rear abutment, means for holding the rear abutment stationary in operative position as long as the trolley head is in contact with the overhead conductor, and means for releasing the said rear abutment to allow the said spring to expand on the trolley head leaving the conductor, the expansion of the spring allowing the trolley pole to fall by its own weight clear of the overhead wiring.

2. Trolley pole construction for an electrically driven vehicle comprising in combination a base, a vertical pivot for the same, a horizontal pivot arranged on the base, a bracket mounted to swing on the said horizontal pivot, a trolley pole fixed to the said bracket, substantially horizontal guide arms fixed to the base, a front abutment adapted to slide on the guides, mechanical connections from the front abutment to the trolley bracket, a rear abutment also sliding on the guides, springs encircling the guide arms arranged between the said front and rear abutments, a catch lever pivoted on the base and adapted to hold the rear abutment stationary at a predetermined distance away from the base, and means on the trolley bracket adapted to engage and move the catch lever out of engagement with the rear abutment when the trolley pole swings upwards to an abnormal extent, to permit the spring to expand and the trolley pole to fall by its own weight.

3. Trolley pole construction for an electrically driven vehicle comprising in combination, a horizontally and vertically pivoted trolley pole, a trolley head thereon adapted to make contact with an overhead conductor a spring for maintaining the said contact arranged between a front abutment connected to the trolley pole and a movable rear abutment, means for holding the rear abutment stationary in operative position as long as the trolley head is in contact with the overhead conductor, means for releasing the rear abutment to allow said spring to expand on the trolley head leaving the conductor, and means for resetting the spring by the rotation of the trolley pole round its vertical pivot.

4. Trolley pole construction for an electrically driven vehicle, comprising in combination, a horizontally and vertically pivoted trolley pole, a trolley head thereon adapted to make travelling contact with an overhead conductor, a spring for maintaining the said contact arranged between a front abutment connected to the trolley pole and a movable rear abutment, means for holding the rear abutment stationary in operative position as long as the trolley head is in contact with the overhead conductor, means for releasing the said rear abutment to allow the said spring to expand on the trolley head leaving the conductor, a contact member on the rear abutment and a cam fixed on the roof of the vehicle adapted to be engaged by the said contact member to enable the rear abutment to be pushed forward to compress and re-set the spring by the rotation of the trolley pole round its vertical pivot.

5. Trolley pole construction for an electrically driven vehicle, comprising in combination a horizontally and vertically pivoted trolley pole, a trolley head thereon adapted to make travelling contact with an overhead conductor, a spring for maintaining the said contact arranged between a front abutment connected to the trolley pole and a movable rear abutment, means for normally holding the rear abutment stationary in operative position, and means carried by the trolley pole for releasing the said rear abutment to allow the said spring to expand on the trolley pole engaging an obstruction.

6. Trolley pole construction for an electrically driven vehicle, comprising in combination a horizontally and vertically pivoted trolley pole, a trolley head thereon adapted to make travelling contact with an overhead conductor, a spring for maintaining the said contact arranged between a front abutment connected to the trolley pole and a movable rear abutment, means for normally holding the rear abutment stationary in operative position and means carried by the trolley pole for releasing the said rear abutment to allow the said spring to expand on the trolley pole engaging an obstruction, comprising a two-arm lever pivoted on the trolley pole, one arm of the lever suitably arranged to be engaged by an obstruction in the path of the trolley pole and the other arm mechanically connected to said rear abutment.

7. Trolley pole construction for an electrically driven vehicle comprising in combination a base, a vertical pivot for the same, a horizontal pivot arranged on the base, a bracket mounted to swing on the said horizontal pivot, a trolley pole fixed to the said bracket, substantially horizontal guide arms fixed to the base, a front abutment adapted to slide on the guides, mechanical connections from the front abutment to said trolley bracket, a rear abutment also sliding on the guides, springs encircling the guide arms arranged between the said front and rear abutments, two catch levers pivoted one on the one side and the other on the other side of the base and adapted to engage the rear abutment, two release members secured one on each side of the trolley bracket each having a projecting arm adapted to move the corresponding catch lever out of engagement with the rear abutment when the trolley pole swings upwards to an abnormal extent to permit the springs to expand and the trolley pole to fall, a vertically pivoted roller arranged beneath the rear abutment, and a cam fixed on the roof of the vehicle adapted to be engaged by said roller to cause the rear abutment to be pushed into position to re-set the springs by the rotation of the trolley pole round its vertical pivot.

8. Trolley pole construction for an electrically driven vehicle, comprising in combination a horizontally and vertically pivoted trolley pole, a trolley head thereon adapted to make travelling contact with an overhead conductor, a spring for maintaining the said contact arranged between a front abutment connected to the trolley pole and a movable rear abutment, means for holding the rear abutment stationary in operative position as long as the trolley head is in contact with the overhead conductor, a catch lever pivoted on the base and adapted to engage the rear abutment, a release arm secured on the trolley pole adapted to make contact with and move the catch lever out of engagement with the said rear abutment when the trolley pole swings upwards to an abnormal extent, and means for varying and adjusting the contact position of the release arm.

9. Trolley pole construction for an electrically driven vehicle comprising in combination a base, a vertical pivot for the same, a horizontal pivot arranged on the base, a bracket mounted to swing on the said horizontal pivot, a trolley pole fixed to the said bracket, substantially horizontal guide arms fixed to the base, a front abutment adapted to slide on the guides, mechanical connections from the front abutment to said trolley bracket, a rear abutment also sliding on the guides, springs encircling the guide arms arranged between the said front and rear abutments, means for holding the rear abutment stationary in operative position as long as the trolley head is in contact with the overhead conductor, means for releasing the rear abutment when the trolley pole swings upwards to an abnormal extent to permit the springs to expand and the trolley pole to fall, a bracket arranged to slide on the guide arms in front of the front abutment, mechanical connections from said sliding bracket to the rear abutment, a contact roller on said bracket, and a cam fixed on the roof of the vehicle adapted to be engaged by said roller to move the sliding bracket and thence the rear abutment away from the base to reset the springs when the trolley pole is rotated round its vertical pivot.

In testimony whereof, I affix my signature.

PATRICK ROBBINS.